United States Patent [19]

Gage et al.

[11] Patent Number: 5,353,272
[45] Date of Patent: Oct. 4, 1994

[54] APPARATUS AND METHOD FOR A MODIFIED HALF-APERTURE FOCUS/TRACKING/DATA SENSOR SYSTEM

[75] Inventors: Edward C. Gage, Fairport; David B. Kay, Rochester, both of N.Y.

[73] Assignee: Eastman Kodak Company, Rochester, N.Y.

[21] Appl. No.: 997,809

[22] Filed: Dec. 29, 1992

[51] Int. Cl.$^5$ .............................................. G11B 7/00
[52] U.S. Cl. .................. 369/120; 369/44.23; 369/112; 250/201.5
[58] Field of Search ............ 369/120, 112, 44.23, 369/44.41, 44.42; 250/201.5

[56] References Cited

U.S. PATENT DOCUMENTS

| | | | |
|---|---|---|---|
| 3,876,841 | 4/1975 | Kramer et al. | 179/100.3 |
| 4,025,949 | 5/1977 | Whitman | 369/112 |
| 4,059,841 | 11/1977 | Bricot et al. | 250/201.5 |
| 4,079,248 | 3/1978 | Lehureau et al. | 250/201 |
| 4,165,519 | 8/1979 | Goto | 358/128 |
| 4,517,666 | 5/1985 | Ando | 369/45 |
| 4,521,680 | 6/1985 | Ando | 250/201 |
| 4,546,460 | 10/1985 | Ando | 369/45 |
| 4,665,310 | 5/1987 | Heemskerk | 250/201 |
| 4,672,188 | 6/1987 | Cohen | 250/201 |
| 4,712,205 | 12/1987 | Smid | 369/112 |
| 5,036,185 | 7/1991 | Ando | 369/44.23 |
| 5,161,139 | 11/1992 | Inoue et al. | 369/44.23 |

FOREIGN PATENT DOCUMENTS

0177108A1 9/1986 European Pat. Off. .

Primary Examiner—Paul M. Dzierzynski
Assistant Examiner—Kiet T. Nguyen
Attorney, Agent, or Firm—Raymond L. Owens

[57] ABSTRACT

In a sensor system for use in the read/write head of an optical information storage and retrieval system, a dual prism separates the resulting radiation beam into two radiation components, the radiation components having a division perpendicular to a projection of a data track or groove on the storage medium projected on the dual prism. Each of the two radiation components is focused by a focus sensor lens on one of two four-quadrant sensors, the four-quadrant sensors forming the system sensor array. The application of the two radiation components generates a tracking signal, a focusing error signal, and a data signal. The orientation of the dual prism results in reduced cross-talk between the tracking signal, which is derived from positive and negative diffraction components, and the focusing signal, which is derived from radiation components having contributions from both the positive and negative diffraction components. The optical components are selected to provide an astigmatism in the radiation components to minimize abrupt changes in the sensor response. For example, a cylindrical lens can be added in the optical path near the focus sensor lens to defocus the return radiation components in a direction perpendicular to a projection of the data track on the sensor array.

18 Claims, 5 Drawing Sheets

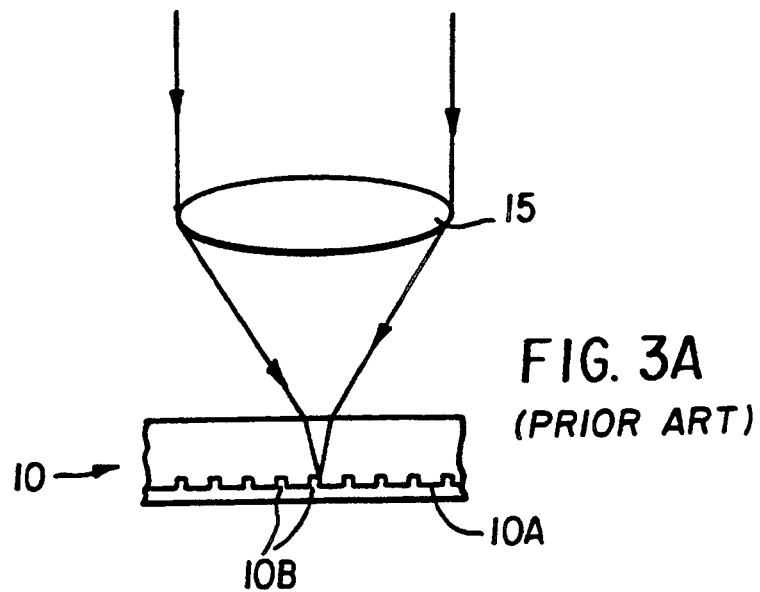
FIG. 3A
(PRIOR ART)
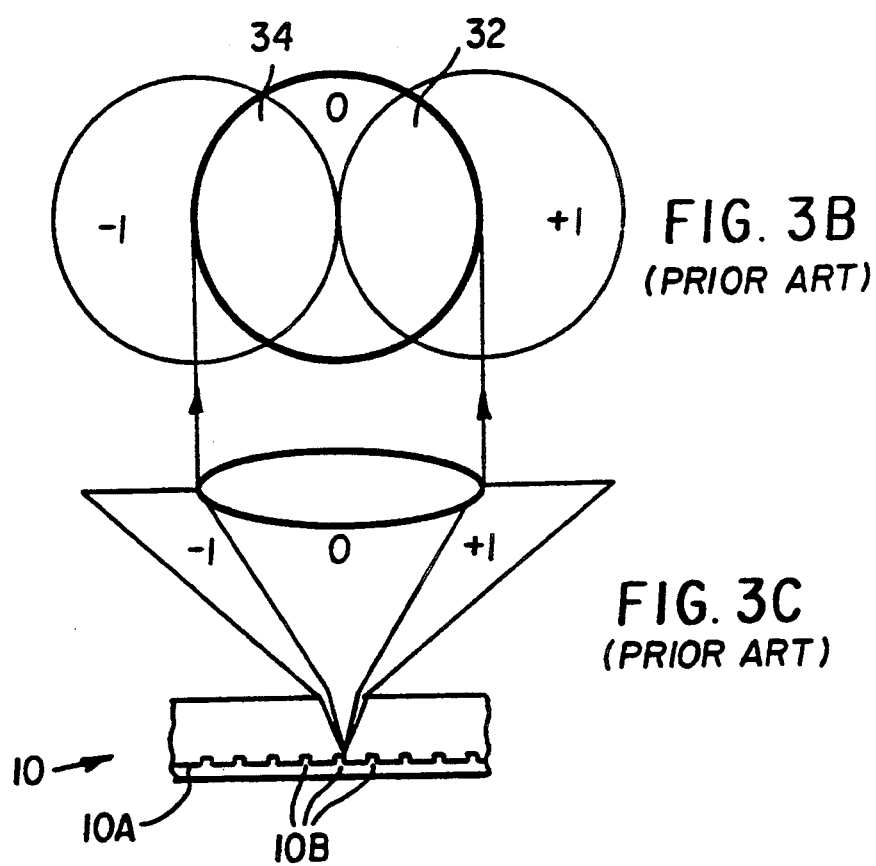
FIG. 3B
(PRIOR ART)
FIG. 3C
(PRIOR ART)

APPARATUS AND METHOD FOR A MODIFIED HALF-APERTURE FOCUS/TRACKING/DATA SENSOR SYSTEM

BACKGROUND OF THE INVENTION

1. Field of Invention

This invention relates generally to the read/write heads used in optical information storage and retrieval systems and, more particularly, to the apparatus, associated with the read/write head, used for providing the tracking signals and the focusing signals which control the interaction of the radiation beam with the storage medium.

2. Description of the Related Art

Referring to FIG. 1, one configuration for an optical information storage and retrieval system according to the related art is shown. A radiation source 11, typically a laser diode, provides a radiation beam which is collimated by collimating lens 12. The collimated radiation beam is transmitted through a polarization beam splitter 13 and applied to a quarter wave plate 14. The polarization beam splitter 13 provides linear polarization for the radiation beam and the quarter wave plate 14 provides a circular polarization to the radiation beam. The circularly polarized radiation beam transmitted by the quarter wave plate 14 is focused by objective lens 15 on the information storage surface 10A of the storage medium 10. The storage medium 10 is typically a disk with a surface which interacts with the circularly polarized radiation beam. The interaction with the storage medium surface 10A causes the radiation beam to be reflected and diffracted therefrom. The resulting radiation beam is collimated by objective lens 15 and the collimated resulting radiation beam is transmitted through the quarter wave plate 14. The quarter wave plate restores the linear polarization of the radiation beam. However, a component of the restored polarized radiation beam perpendicular to the polarization of the originally polarized beam will typically be present as a result of the second passage through the quarter wave plate 14. When the restored, polarized radiation beam is applied to the polarization beam splitter 13, the perpendicular component will be reflected by the beam splitter 13, while a small percentage (typically 1%–2%) of the perpendicular component is transmitted through the polarization beam splitter 13. The reflected radiation beam is applied to a sensor focusing lens 16 which focuses the resulting radiation beam on sensor array 5. The resulting radiation beam has imposed thereon modulation that can be processed to provide the information (or data) which is stored on the storage medium. In addition, the resulting radiation beam can be processed in such a manner as to provide tracking and focusing signals which can be used to activate apparatus which controls the position of the focused radiation beam on the storage surface 10A (i.e., the tracking in one dimension) and which controls the distance of the objective lens 15 from the storage surface 10A, (i.e., the focusing of the radiation beam on the storage surface). In this type of optical information storage and retrieval system, the quarter wave plate imparts, to the radiation beam illuminating the storage surface 10A, a circular polarization. After reflection from the storage surface, the quarter wave plate restores the linear polarization. However, the linearly polarized radiation beam will have a component which is rotated by an angle of 90° from the plane of polarization originally established by the polarization beam splitter 13. The rotated component of the radiation resulting from interaction with the storage surface 10A is reflected by the beam splitter 13 and applied to sensor array 5.

Referring to FIG. 2, an example of the use of the processing of the radiation beam to provide tracking and focusing signals, according to the related art, is shown. This example is taken from European Patent Application 0,177,108 A1, issued in the name of A. Smid, P. F. Grave, and H 't Lam, entitled "OptoElectronic Focussing-Error Detection System, and filed on Feb. 10, 1985. In FIG. 2, the path of the resulting radiation beam, the resulting radiation beam being the radiation beam which has interacted with data track 21, is shown. (The quarter wave plate 14 and the beam splitter 13 have been omitted to emphasize certain important aspects of the configuration.) The data track 21 is the path on the storage surface (10A) along which the radiation beam will move in accessing or storing the information encoded on the storage medium 10. A dual prism 25 is shown interposed between the objective lens 15 and the sensor focusing lens 16. The dual prism divides the resulting radiation beam into two components. The two radiation components include the radiation reflected and radiation diffracted from the storage medium. The first component is focused on dual sensor elements A and B of the sensor array 5, while the second radiation beam component is focused on dual sensor elements C and D. As will be known to those skilled in the art of processing resulting radiation beams, the data signal DS, the focusing signal FS, and the tracking signal TS are given respectively by:

$$DS = A + B + C + D \qquad 1.)$$

$$FS = (A+D) - (B+C) \qquad 2.)$$

$$TS = (A+C) - (B+D) \qquad 3.)$$

where A, B, C, and D of the Equations 1–3 represent the voltages developed by the equivalently designated sensor element in response to radiation applied thereto. The data signal DS is the sum of voltages developed by all of the sensor elements. The focusing signal FS is the difference between the sum of the voltages resulting from the radiation applied to a first pair of diagonal sensor elements, i.e., A and D, and the sum of the voltages resulting from the complementary diagonal pair of sensors, i.e., B and C. When the absolute value of the focusing signal FS is minimized, the radius of the radiation beam on the storage surface 10A will be minimized, i.e., the radiation beam will be focused on the storage surface 10A. The tracking signal TS is minimized when the radiation reflected and diffracted from above the center of the data track and the radiation reflected and diffracted from the below the center of the data track are equal. In order to understand the origin of the tracking signal, the role of the diffraction of the radiation beam must be understood.

Referring to FIG. 3A, the objective lens 15 is shown focusing the circularly polarized radiation beam on the storage surface 10A of storage medium 10. The storage surface 10A is shown as having a multiplicity of grooves, or equivalently, a multiplicity of data tracks 10B fabricated therein. The grooves 10B have dimensions relative to the wavelength of the radiation beam whereby diffraction patterns are formed. The data tracks 10B can be replaced with series of raised regions which are not connected, can be replaced with regions of appropriate dimension and refractive index, or any other structure which provides diffraction patterns in response to an impinging radiation beam without departing from the scope of the present invention. Referring to FIG. 3B, the resulting radiation beam after interaction with the storage surface is shown. The resulting radiation beam includes a zeroth order (reflected) component and a positive and a negative diffracted component. As will be clear, higher order diffraction components can be present, however, the present invention can be understood without further consideration of these components. The impinging radiation beam is shown as being off center and therefore closer to one edge of the data track or groove which is currently being tracked. This asymmetric positioning causes a wavefront phase shift in the diffracted orders and, consequently, an asymetric interference between each of the diffracted components and the undiffracted (i.e., reflected or zeroth order radiation component). As a consequence, constructive interference occurs in one region, e.g., the region of overlap between the reflected radiation component and the + diffracted radiation component, while destructive interference occurs between the reflected radiation component and the −1 diffracted component. The magnitude of the resulting signal depends on the amount of shift of the impinging beam relative to the center of the data track or groove. In FIG. 3C, the difference between the intensities of the regions of interference is illustrated by region 32 (wherein the undiffracted radiation component and the +1 first order interference component interfere) and region 34 (wherein the undiffracted radiation beam component and the −1 first order diffracted radiation beam interfere). The polarity depends on whether the tracking of the radiation beam occurs for the data tracks (or grooves) or for the lands, i.e., the regions between the data tracks or grooves. Note that in the preferred embodiment, the two first order diffraction components are contiguous with the optic axis of the radiation beam. As a consequence, the two first order diffraction components will be superimposed on and will interfere with the reflected radiation beam. Referring once again to FIG. 2, the projection of the first order diffraction patterns 29A and 29B are shown on objective lens 15 and on dual prism 25. The difference in intensities of the resulting radiation components separated by dual prism 25 is determined by the relative intensities of the radiation components resulting from the interference between the undiffracted (reflected) radiation component and the first order diffraction components. It will be clear that the groove can be replaced by a diffracted and undiffracted radiation components resulting from applying a radiation beam to a data track without an associated groove, the data track implemented to provide the requisite diffracted and undiffracted radiation components.

The configuration for providing tracking signals and focusing signals, as disclosed by the Smid and described above, suffers from the presence of a significant amount of optical cross-talk, generally originating from ever-present optical wavefront aberrations. Referring to FIG. 4, an experimental verification of the optical cross-talk between the tracking signal and the focusing signal is illustrated. The presence of this optical cross-talk becomes particularly important in high performance systems such as are required in the information storage and retrieval systems.

In U.S. patent application Ser. No. 07/998,179 filed on Dec. 29, 1992 in the name of David B. Kay, entitled APPARATUS AND METHOD FOR A DUAL HALF APERTURE FOCUS SENSOR, and assigned to the assignee of the present invention, a configuration is disclosed which minimizes the cross-talk between the tracking signal and the focusing signal. Referring to FIG. 5, the configuration of optical and electrical components which provide data, tracking, and focusing signals while reducing the optical cross-talk, according to the Kay Application, is shown. As in FIG. 2, the apparatus interacts with the resulting radiation beam, i.e., the radiation beam which has interacted with the storage medium 10. Other components such as the quarter wave plate shown in FIG. 1 has been omitted for clarity. The resulting radiation beam is recollimated by objective lens 15. The first order diffraction components 29A and 29B are shown projected on objective lens 15. As will be clear, the reflected radiation component is also present and collimated by the objective lens 15. The collimated radiation beam is applied to beam splitter 52 where a portion of the collimated radiation beam is reflected and applied to dual element sensor 51, the dual element sensor having sensor elements E and F. Each of the sensor elements E and F have applied thereto a portion of the diffracted and reflected radiation beam, the diffracted radiation component interfering with the reflected radiation component. The portion of the radiation beam applied to each sensor element E and F includes interference radiation resulting from only one first order diffraction component. The remainder of the collimated radiation beam transmitted by beam splitter 52 is applied to dual prism 55. The dual prism 55 divides the resulting radiation component into two sensor radiation beam components. Comparing dual prism 55 with dual prism 25 of FIG. 2, the division between the elements of the dual prism 55 is rotated 90° with respect to the projection of the data track 21 on the prism. Therefore, the focusing radiation components include portions of both first order diffraction components as illustrated by the shadowing shown on the dual prism 55. Sensor focusing lens 16 focuses the radiation component from each prism element of the dual element prism 55 on one of the dual element sensors 5. The first dual element sensor has elements A and B associated therewith while the second dual element sensor has sensor elements C and D associated therewith. The disclosed configuration, as shown by inspection of FIG. 5, includes a separate path for the tracking signal and for the focusing signal. The separate paths diminish the intensity of the radiation beam and require additional space on the read/write head. In typical optical storage systems having a read/write head, the space available for signal processing is limited.

A need has therefore been for an apparatus and an associated method for incorporation in the read/write head for producing the tracking signals, the focusing signals, and the data signals for which the cross-talk between the tracking signals and the focusing signals can be minimized without the additional space on the read/write head required in the related art.

SUMMARY OF THE INVENTION

The present invention is directed to overcoming one or more of the problems set forth above. Briefly summarized, according to one aspect of the present invention, a read/write head includes an objective lens, a dual prism, and a sensor array as in the related art. However, the elements of the dual prism are divided in a direction perpendicular to projection of the data track or groove on the prism. The sensor array, rather than having two dual sensor arrays as disclosed in the related art, is comprised of two four-quadrant sensor arrays. The signals resulting from the two four-quadrant sensor arrays can be combined to provide the tracking, the focusing, and the data signals without requiring a separate optical path for the tracking signal generation. A cylindrical lens can be positioned in the optical path to provide an astigmatism in the optical path and thereby improve the sensitivity of the sensor array. The orientation of the dual prism results in reduced cross-talk between the tracking and the focusing signals.

The present invention, therefore, advantageously provides a technique for minimizing the cross-talk between the tracking and the focusing signals. The reduction in cross-talk enhances the performance of the disclosed read/write heads as compared to the read/write heads of the related art. The configuration of the present invention obviates the need for separate path for the tracking and focusing signals.

These and other aspects, objects, features and advantages of the present invention will be more clearly understood and appreciated from a review of the following detailed description of the preferred embodiments and appended claims, and be reference to the accompanying drawings.

BRIEF DESCRIPTION OF THE DRAWINGS

FIG. 3A, FIG. 3B, and FIG. 3C illustrate the generation of the first order diffraction components for a radiation beam illuminating a groove or data track in an optical storage medium along with the interference patterns resulting therefrom.

DESCRIPTION OF THE PREFERRED EMBODIMENTS

Detailed Description of the Figures

FIG. 1, FIG. 2, FIG. 3A, FIG. 3B, FIG. 3C, FIG. 4, and FIG. 5 have been described in relation to the related art.

Figure 1:
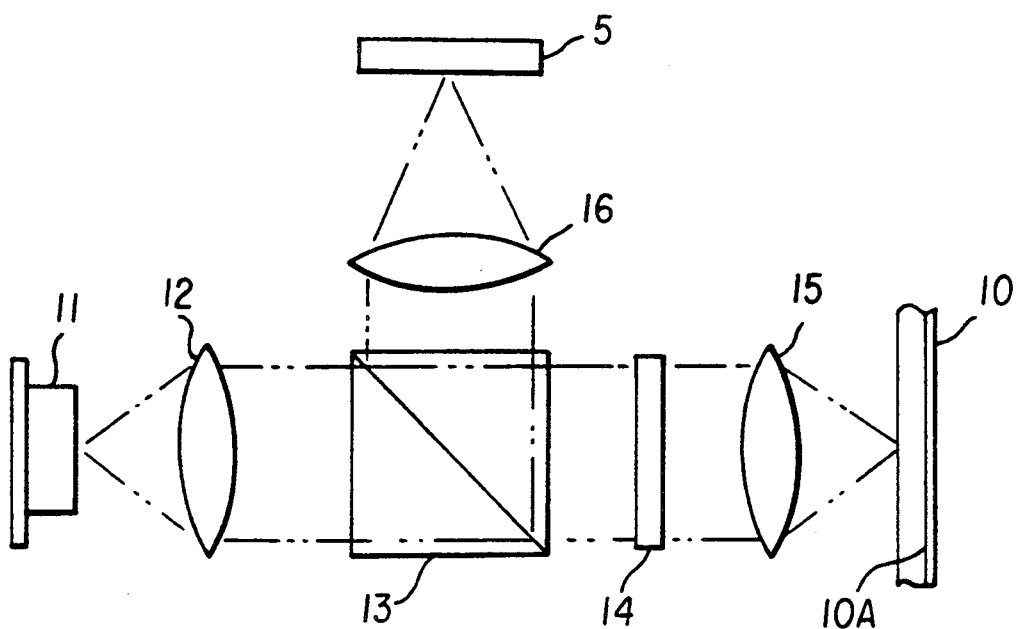
FIG. 1 is a top view of a block diagram of components for reading data from and writing data on an optical storage medium according to the related art.
Figure 2:
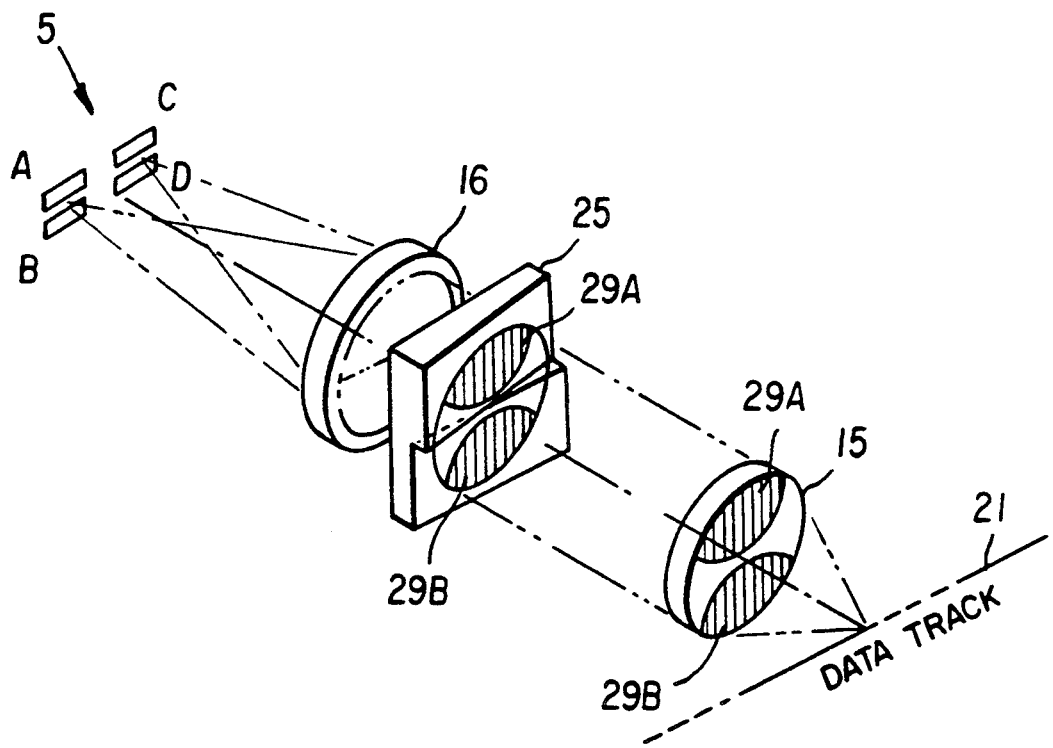
FIG. 2 is perspective view of the components processing the resulting radiation beam to provide tracking, focusing and data signals according to the related art.
Figure 4:
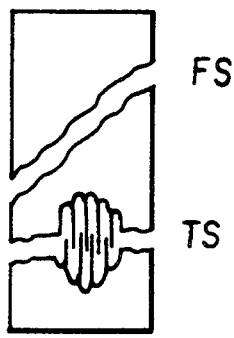
FIG. 4 illustrates an experimental verification of the presence of optical cross-talk between the tracking signal and the focusing signal.
Figure 5:
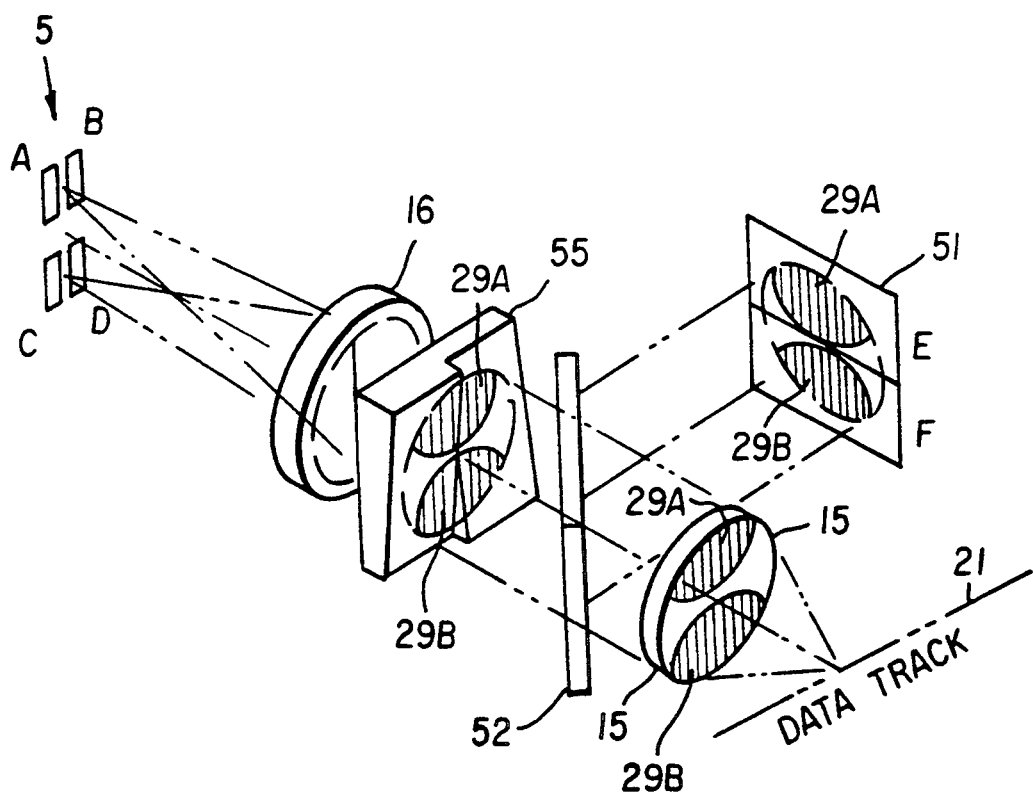
FIG. 5 is a perspective view of a block diagram of a configuration of optical components and sensor components capable of generating tracking and focus signals which minimizes the cross-talk between the tracking and the focusing signals.
Figure 6A:
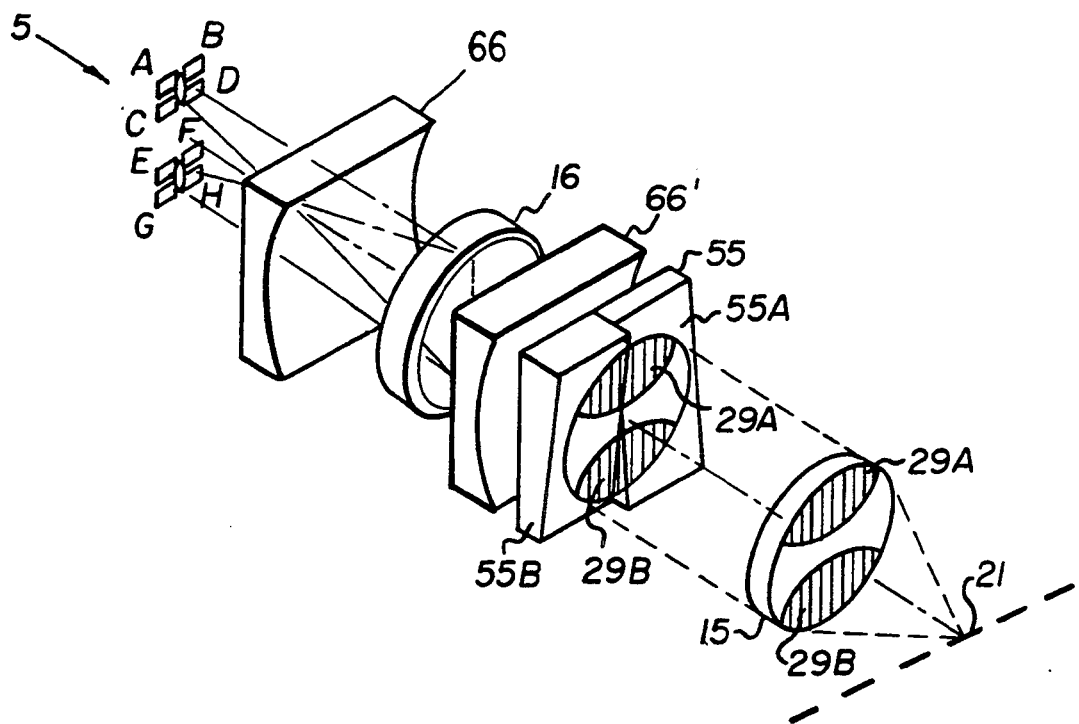
FIG. 6A is a perspective view of a block diagram of the optical components and sensor components which minimize the cross-talk between tracking and focus signals according to the present invention.
Figure 6B:
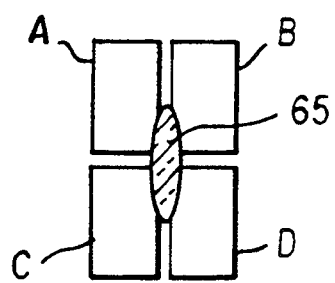
FIG. 6B is an enlarged view of the one of the four-quadrant sensor units with the radiation beam applied thereto according to the present invention.

Referring to FIG. 6A, the optical and sensor components for providing the tracking signals, the focusing signals, and the data signals, according to the present invention, are shown. The resulting radiation beam, having interacted with a selected portion of data track 21 formed in the storage medium (10), is collimated by objective lens 15. The collimated resulting radiation beam is applied to dual prism 55. The dual prism 55, having prism components 55A and 55B, divides the resulting radiation beam into two components, the division being along a line perpendicular to the projection of data track 21 on the dual prism. The two resulting radiation components are focused by sensor focusing lens 16 and cylindrical lens 66. Each resulting radiation component subsequently converges on a quadrant sensor element component of the sensor array 5. The cylindrical lens 66 provides an astigmatism in the optical path which results in a radiation beam defocusing in a direction perpendicular to an optical projection of the data track 21 along the optical path. A cylindrical lens can be positioned either behind the sensor focusing lens 16 (i.e., as shown by cylindrical lens 66 in FIG. 6A) or between the sensor focusing lens 16 and the dual prism 55 (i.e., as shown by cylindrical lens 66' in FIG. 6A). In the preferred embodiment, the radiation applied to the sensor array is in-focus in the direction parallel to the projection of the data track 21 on the sensor array 5 and out-of-focus in a direction perpendicular to the projection of the data track 21 on the sensor array 5 as shown in FIG. 6B. One four-quadrant sensor element array includes sensor elements A, B, C, and D, while the second four-quadrant sensor element array includes sensor elements E, F, G, and H. In FIG. 6A, the projection of the two first order diffraction components 29A and 29B is shown on the lens 15 and on the dual prism 55. Both four-quadrant sensor element arrays receive portions of both the positive and negative (first) order diffraction patterns.

Figure 7:
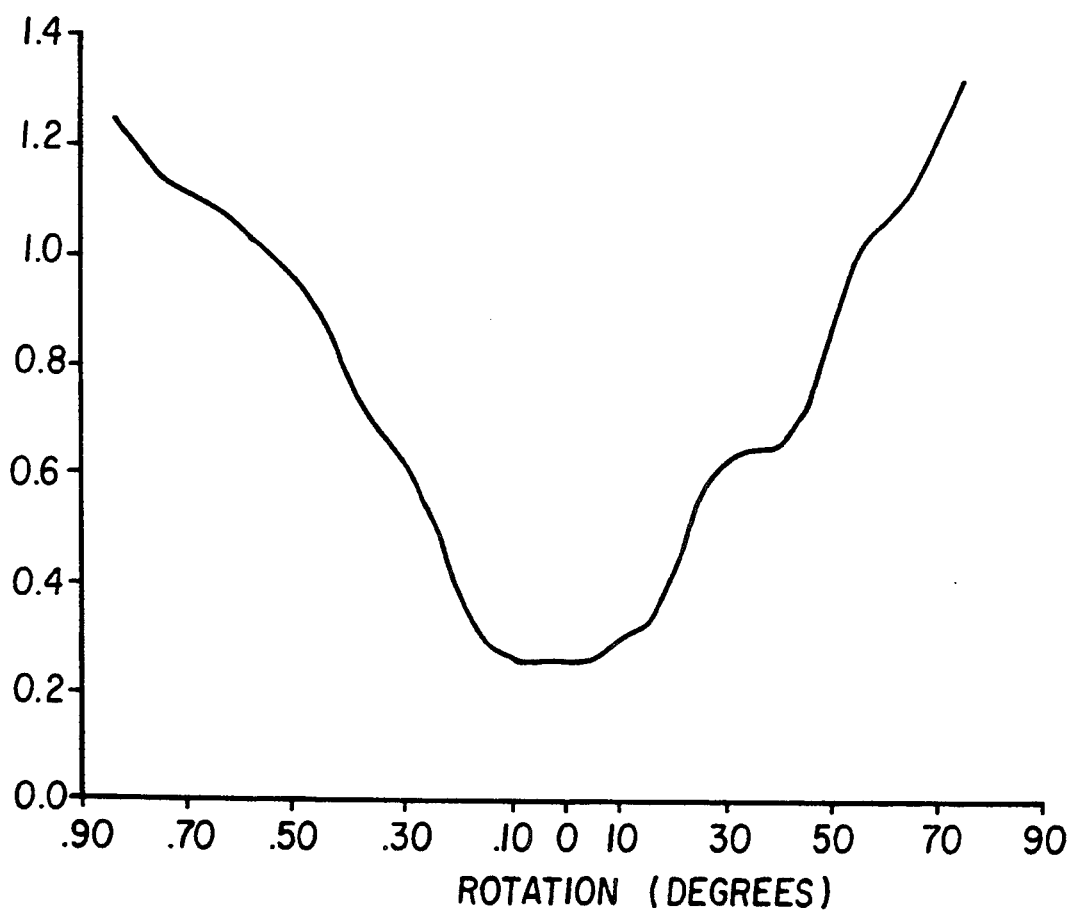
FIG. 7 illustrates the effect of rotating the dual prism from the orientation relative to a projection of the data track on the dual prism according to the present invention to the orientation of the dual prism relative to a projection of a data track as disclosed in the related art.

Referring next to FIG. 7, the result of changing the configuration of the present invention into the configuration of the related art on the cross-talk between the tracking signal and the focusing signal is shown. When the prism is in the 0° graph position, (i.e., the angle of the present invention or wherein the division between the elements of the dual prism is at an angle of approximately 90° with respect to projection of the data track on the prism), the cross-talk is at a minimum. As the prism is rotated into a position that is similar to the configuration shown in the reference of Smid et al, (i.e., having an angle of approximately 0° with respect to the projection of the data track on the prism) the cross-talk noise increases more than 5 times. This cross-talk level, for the parameters of the disk storage medium upon which the measurements were made, amounts to a focus excursion of the focus signal head of over 1 micron. As a consequence, high performance is difficult to achieve when the tracking and the focusing signals are coupled.

Operation of the Referred Embodiment

Referring once again to FIG. 6, the signals provided by the detector array of the present invention include the tracking signal (TS), the focusing signal (FS), and the data signal (DS). As will be clear from FIG. 6 with the displayed arrangement of sensor elements for the two four-quadrant sensor element array, the tracking signal is given by:

$$TS = (A+B+E+F) - (C+D+G+H), \quad \quad 4.)$$

where the A, B, C, D, E, F, G, and H in the equation refer to signal levels generated by the associated sensor element in response to radiation being applied thereto. Similarly, the focusing signal is given by:

$$FS = (A+C+F+H) - (B+D+E+G), \quad \quad 5.)$$

and the data signal is given by:

$$DS = (A+B+C+D+E+F+G+H). \quad \quad 6.)$$

With the orientation of the dual prism disclosed by the present invention, the cross-talk between the tracking signal and the focusing signal is minimized. In addition, the resulting radiation beams do not have to be separated by, for example, the beam splitter 55 of FIG. 5. Therefore, the present invention provides the apparatus and method for separating signal components necessary to the operation of the read/write head, however, with the added advantage that high performance can be achieved with a reduced space in the read/write head. The use of a dual prism rather than, for example, a dual grating, reduces the wavelength dependence.

The cylindrical lens 66 defocuses the component return radiation beams perpendicular to the direction of data track projected on the dual prism. This defocusing provides radiation components suitable for generation of the tracking signal. The astigmatism provided by the cylindrical lens can be achieved by other embodiments which will be clear to those skilled in the art. For example, the sensor focus lens and the cylindrical lens can be replaced by a pair of cylindrical lenses with parameters and positions selected appropriately.

The invention and the related art has been described using the example of a write-once and/or a read/only optical information storage system (i.e., wherein data is encoded by modifying the reflectivity of the storage medium). However, the present invention is also applicable to the erasable magneto-optical storage systems (wherein data is encoded by modifying the polarization of the reflected radiation beam.

It will be clear to those skilled in the art that the tracking signals described herein control what is generally referred to as the fine tracking. Typically, the read/write head has separate mechanism for the gross movement of the read/write head across the storage medium, e.g. across the data tracks of a storage disk.

Operation of the present invention is believed to be apparent from the foregoing description and drawings, but a few words will be added for emphasis. The correct orientation of the prism which separates the return radiation beam into two components provides a significant reduction in the cross-talk between the tracking control signal and the focusing control signal. The reduction in the cross-talk permits the achievement of high performance generally required for information storage and retrieval systems in current use. It will be further clear that the tracking signal is derived by a coupling of the sensor elements which results in a comparison of the two (first) order diffraction components (through the interference with the undiffracted radiation component). The focusing signal is derived by coupling sensor elements so that instabilities generated by the diffraction components are generally cancelled.

While the invention has been described with reference to a sensor array in a read/write head of an optical information storage and retrieval system, it is apparent that the invention is easily adapted to other devices that provide a radiation beam in which various non-data information is imposed on the radiation beam as a result of operational considerations. Specifically, when the non-data information is the result of interference between a reflected radiation component and the first order or greater diffraction components, the diffraction components resulting from the interaction of the radiation beam with the data track can be processed and the non-data information retrieved.

While the invention has been described with particular reference to a preferred embodiment, it will be understood by those skilled in the art that various changes may be made and equivalents may be substituted for elements of the preferred embodiment without departing from invention. By way of specific example, the dual prism could be replaced by a dual grating. In addition, many modifications may be made to adapt a particular situation and material to a teaching of the invention without departing from the essential teachings of the present invention. Again, by way of example, the disclosed configuration provides that the radiation beam is reflected from the storage medium surface. As will be clear to those skilled in the art, the 'resulting' radiation beam could be provided by a radiation beam transmitted through the storage medium after interaction with the (selected) data track. In such a system, additional components are required to replace the components which are used manipulating both the original radiation beam and the resulting radiation beam.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A sensor system for use in conjunction with a read and/or write head of an optical information storage and retrieval systems said sensor system responsive to a resulting radiation beam from a data track on a storage medium of said optical information storage system, said sensor system comprising:

a dual prism having said resulting radiation beam applied thereto for dividing said resulting radiation beam into two resulting radiation beam components, said two resulting radiation beam components divided by a division perpendicular to a projection of said data track on said dual prism;

a sensor array including two four-quadrant sensor components;

a lens for focusing said resulting radiation beam transmitted therethrough on said sensor array wherein a first four-quadrant sensor component of said two four-quadrant sensor components has a first resulting radiation beam component focused thereon and a second four quadrant sensor component of said two four-quadrant sensor components has a second resulting radiation beam component focused thereon; and astigmatic means for defocusing said first and second resulting radiation beam components on said sensor array in a direction perpendicular to said projection of said data track, wherein signals generated by elements of said first and said second four-quadrant sensor are combined to provide a tracking signal and a focusing signal.

2. The sensor system of claim 1 wherein said astigmatic means includes a cylindrical lens positioned proximate said lens in an optical path of said resulting radiation beam, wherein said cylindrical lens defocuses said two radiation beam components on said four-quadrant sensor components in said direction perpendicular to said data track projected on said dual prism.

3. The sensor system of claim 2 wherein said cylindrical lens positioned in front of said lens.

4. The sensor system of claim 2 wherein said cylindrical lens is positioned behind said lens.

5. The sensor system of claim 2 wherein said cylindrical lens, said lens, and said dual prism have any relative position along said optical path.

6. The sensor system of claim 2 further comprising a collimating lens for collimating said return radiation beam prior to application to said dual prism.

7. A method for detecting a resulting radiation beam from a data track of a storage medium of an optical information storage and retrieval systems to provide tracking signals, focusing signals, and data signals; said method including the steps of:
dividing said resulting radiation beam into a first and a second resulting radiation beam components with a prism, a division between said first and said second resulting radiation beam components being perpendicular to a projection of said data track on said prism;
focusing said first resulting radiation beam component on a first four-quadrant sensor;
focusing said second resulting radiation beam component on a second four-quadrant sensor;
providing an astigmatism for defocusing said first and second radiation beam components in a direction perpendicular to said projection of said data track; and
coupling output signals from elements of said first and said second four-quadrant sensors to provide a tracking signal, a focusing signal, and a data signal.

8. The method of claim 7 further comprising a step of collimating said resulting radiation beam prior to application to said dual prism.

9. The method of claim 7 wherein said step of providing said astigmatism includes a step of implementing said astigmatism with a cylindrical lens.

10. The method of claim 9 wherein said dividing step is provided by a dual optical element, said two focusing steps being provided by a lens, said method further comprising a step of positioning said dual optical element, said lens and said cylindrical lens in any relative order.

11. A radiation sensor system responsive to a resulting radiation beam which has interacted with a data track in an optical storage and retrieval systems for providing tracking signals, focusing signals and data signals, said sensor system comprising:
optical means responsive to said resulting radiation beam for providing a first and a second resulting radiation beam components, said first and said second resulting radiation beam components being separated by a division perpendicular to a projection of said data track of said optical storage and retrieval systems on said optical means;
a focusing element for receiving said first and second resulting radiation beam components transmitted by said optical means;
a first four-quadrant sensor, wherein said focusing element focuses said first resulting radiation beam component thereon;
a second four-quadrant sensor, wherein said focusing element focuses said second resulting radiation beam component thereon, first selected sensor elements of said first and said second four-quadrant sensors being coupled to provide a tracking signal, second selected sensor elements of said first and said second four-quadrant sensors being coupled to provide a focusing signal, third selected sensor elements of said first and said second four-quadrant sensors being coupled to provide a data signal; and
astigmatic means for defocusing said first and said second resulting radiation beam components in a direction perpendicular to said projection of said data track.

12. The sensor system of claim 11 wherein said astigmatic means includes a cylindrical lens.

13. The sensor system of claim 11 further comprising a collimating lens for collimating said resulting radiation beam prior to application to said optical means.

14. The sensor system of claim 11 wherein said focusing element includes a focus sensor lens and said astigmatic means includes a cylindrical lens.

15. The sensor system of claim 11 wherein said optical means is a dual prism.

16. The sensor system of claim 11 wherein said astigmatic means and said focusing element include two cylindrical lenses.

17. The sensor system of claim 11 wherein said optical means includes a dual prism and said astigmatic means includes a cylindrical lens.

18. The sensor array of claim 17 wherein said dual prism, said focusing element, and said astigmatic means have any relative order with respect to transmission by said resulting radiation beam.

* * * * *